US011638291B2

(12) United States Patent
Fakoorian et al.

(10) Patent No.: US 11,638,291 B2
(45) Date of Patent: Apr. 25, 2023

(54) JOINT MODULATION AND CODING SCHEME INDICATION FOR DOWNLINK AND UPLINK ALLOCATIONS IN SUB-BAND FULL-DUPLEX

(71) Applicant: QUALCOMM Incorporated, San Diego, CA (US)

(72) Inventors: Seyed Ali Akbar Fakoorian, San Diego, CA (US); Wanshi Chen, San Diego, CA (US); Wei Yang, San Diego, CA (US); Muhammad Sayed Khairy Abdelghaffar, San Jose, CA (US); Ahmed Attia Abotabl, San Diego, CA (US); Seyedkianoush Hosseini, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 17/178,872

(22) Filed: Feb. 18, 2021

(65) Prior Publication Data

US 2021/0377995 A1 Dec. 2, 2021

Related U.S. Application Data

(60) Provisional application No. 63/030,602, filed on May 27, 2020.

(51) Int. Cl.
*H04L 5/14* (2006.01)
*H04W 72/23* (2023.01)
*H04L 1/00* (2006.01)

(52) U.S. Cl.
CPC ............ *H04W 72/23* (2023.01); *H04L 1/001* (2013.01); *H04L 1/0004* (2013.01); *H04L 5/14* (2013.01)

(58) Field of Classification Search
None
See application file for complete search history.

(56) References Cited

U.S. PATENT DOCUMENTS

2016/0156438 A1  6/2016  Sun et al.
2021/0058219 A1  2/2021  Kimura et al.
(Continued)

OTHER PUBLICATIONS

Alcatel-Lucent., et al., "DCI Overhead Reduction for CA," 3GPP Draft, 3GPP TSG RAN WG1 Meeting #66, R1-112406, DCI Overhead Reduction for CA, 3rd Generation Partnership Project (3GPP), Mobile Competence Centre, 650, Route Des Lucioles, F-06921, Sophia-Antipolis Cedex, France, vol. RAN WG1. No. Athens, Greece, Aug. 22, 2011-Aug. 26, 2011, Aug. 18, 2011 (Aug. 18, 2011), XP050537807, 4 pages, [retrieved on Aug. 18, 2011], section 3, 4 p. 4, Differential DCI format for group DL/UL transmissions to multiple UEs with MCS delta.

(Continued)

*Primary Examiner* — Willie J Daniel, Jr.
(74) *Attorney, Agent, or Firm* — Harrity & Harrity, LLP

(57) ABSTRACT

Various aspects of the present disclosure generally relate to wireless communication. In some aspects, a user equipment (UE) may receive a single downlink control information (DCI) message scheduling a simultaneous downlink transmission and uplink transmission in an unpaired band. In some aspects, the single DCI message may include a modulation and coding scheme (MCS) field having one or more bits that indicate a first MCS for the downlink transmission. The UE may determine a second MCS for the uplink transmission based at least in part on an offset from the first MCS for the downlink transmission. Numerous other aspects are provided.

30 Claims, 8 Drawing Sheets

(56) References Cited

U.S. PATENT DOCUMENTS

2021/0345375 A1* 11/2021 Abotabl ............ H04W 72/0446
2021/0360664 A1* 11/2021 Fakoorian ......... H04W 72/0446

OTHER PUBLICATIONS

Branlund D., et al., "Access Messages for Direct Signaling in the AAS Relay Zone," C80216j-07_483, IEE Draft, C80216J-07_483, IEEE—SA, Piscataway, NJ USA, vol. 802 .16j, Sep. 9, 2007 (Sep. 9, 2007), 6 pages, XP017718206, [retrieved on Sep. 9, 2007], p. 3-p. 4.
International Search Report and Written Opinion—PCT/US2021/070172—ISA/EPO—dated May 26, 2021.

* cited by examiner

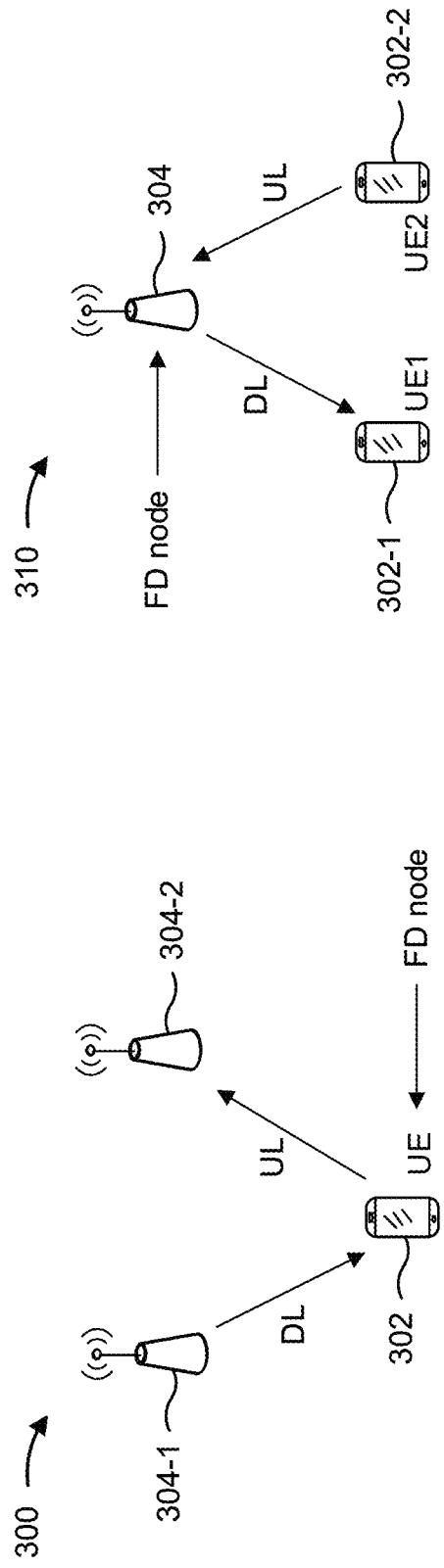
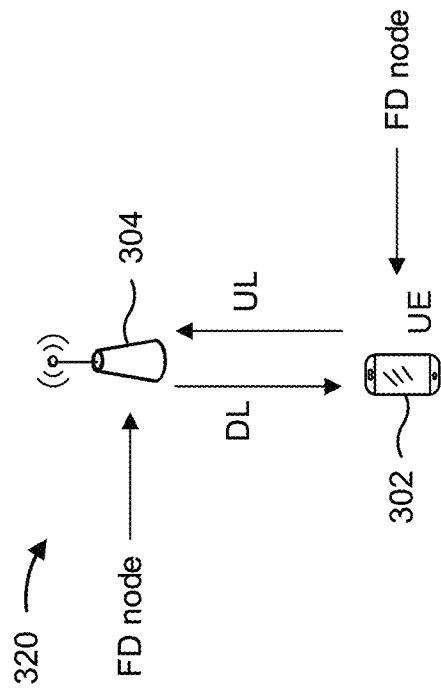
FIG. 3A
FIG. 3B
FIG. 3C

JOINT MODULATION AND CODING SCHEME INDICATION FOR DOWNLINK AND UPLINK ALLOCATIONS IN SUB-BAND FULL-DUPLEX

CROSS-REFERENCE TO RELATED APPLICATION

This Patent Application claims priority to U.S. Provisional Patent Application No. 63/030,602, filed on May 27, 2020, entitled "JOINT MODULATION AND CODING SCHEME INDICATION FOR DOWNLINK AND UPLINK ALLOCATIONS IN SUB-BAND FULL-DUPLEX," and assigned to the assignee hereof. The disclosure of the prior Applications is considered part of and is incorporated by reference into this Patent Application.

FIELD OF THE DISCLOSURE

Aspects of the present disclosure generally relate to wireless communication and to techniques and apparatuses associated with a joint modulation and coding scheme (MCS) indication for downlink and uplink allocations in sub-band full-duplex.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include: receiving a single downlink control information (DCI) message scheduling a simultaneous downlink transmission and uplink transmission in an unpaired band, wherein the single DCI message includes a modulation and coding scheme (MCS) field having one or more bits that indicate a first MCS for the downlink transmission; and determining a second MCS for the uplink transmission based at least in part on an offset from the first MCS for the downlink transmission.

In some aspects, a UE for wireless communication may include a memory and one or more processors operatively coupled to the memory. The memory and the one or more processors may be configured to: receive a single DCI message scheduling a simultaneous downlink transmission and uplink transmission in an unpaired band, wherein the single DCI message includes an MCS field having one or more bits that indicate a first MCS for the downlink transmission; and determine a second MCS for the uplink transmission based at least in part on an offset from the first MCS for the downlink transmission.

In some aspects, a non-transitory computer-readable medium may store one or more instructions for wireless communication. The one or more instructions, when executed by one or more processors of a UE, may cause the one or more processors to: receive a single DCI message scheduling a simultaneous downlink transmission and uplink transmission in an unpaired band, wherein the single DCI message includes an MCS field having one or more bits that indicate a first MCS for the downlink transmission; and determine a second MCS for the uplink transmission based at least in part on an offset from the first MCS for the downlink transmission.

In some aspects, an apparatus for wireless communication may include: means for receiving a single DCI message scheduling a simultaneous downlink transmission and uplink transmission in an unpaired band, wherein the single DCI message includes an MCS field having one or more bits that indicate a first MCS for the downlink transmission; and means for determining a second MCS for the uplink transmission based at least in part on an offset from the first MCS for the downlink transmission.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating examples of full-duplex communication, in accordance with various aspects of the disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
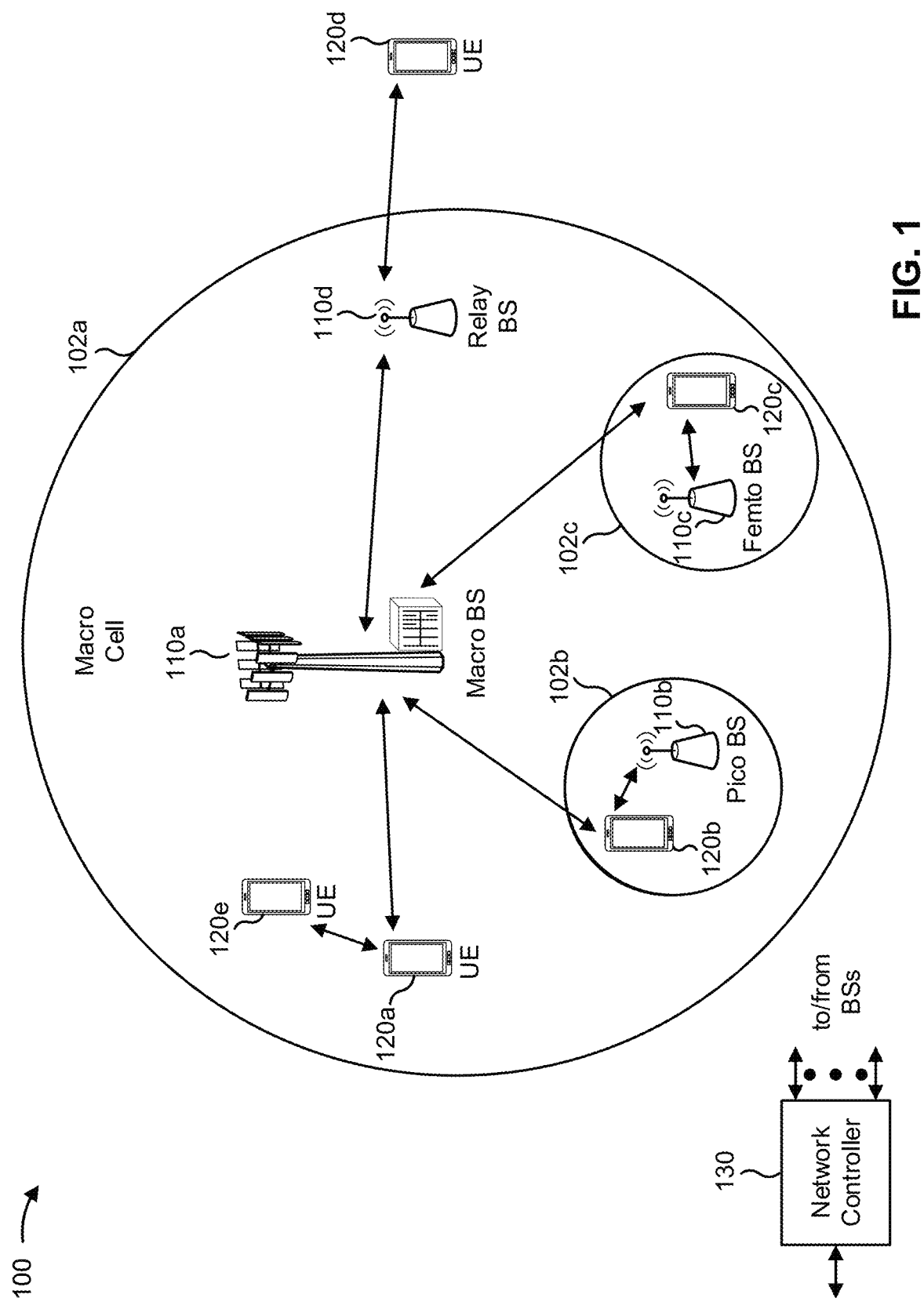
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
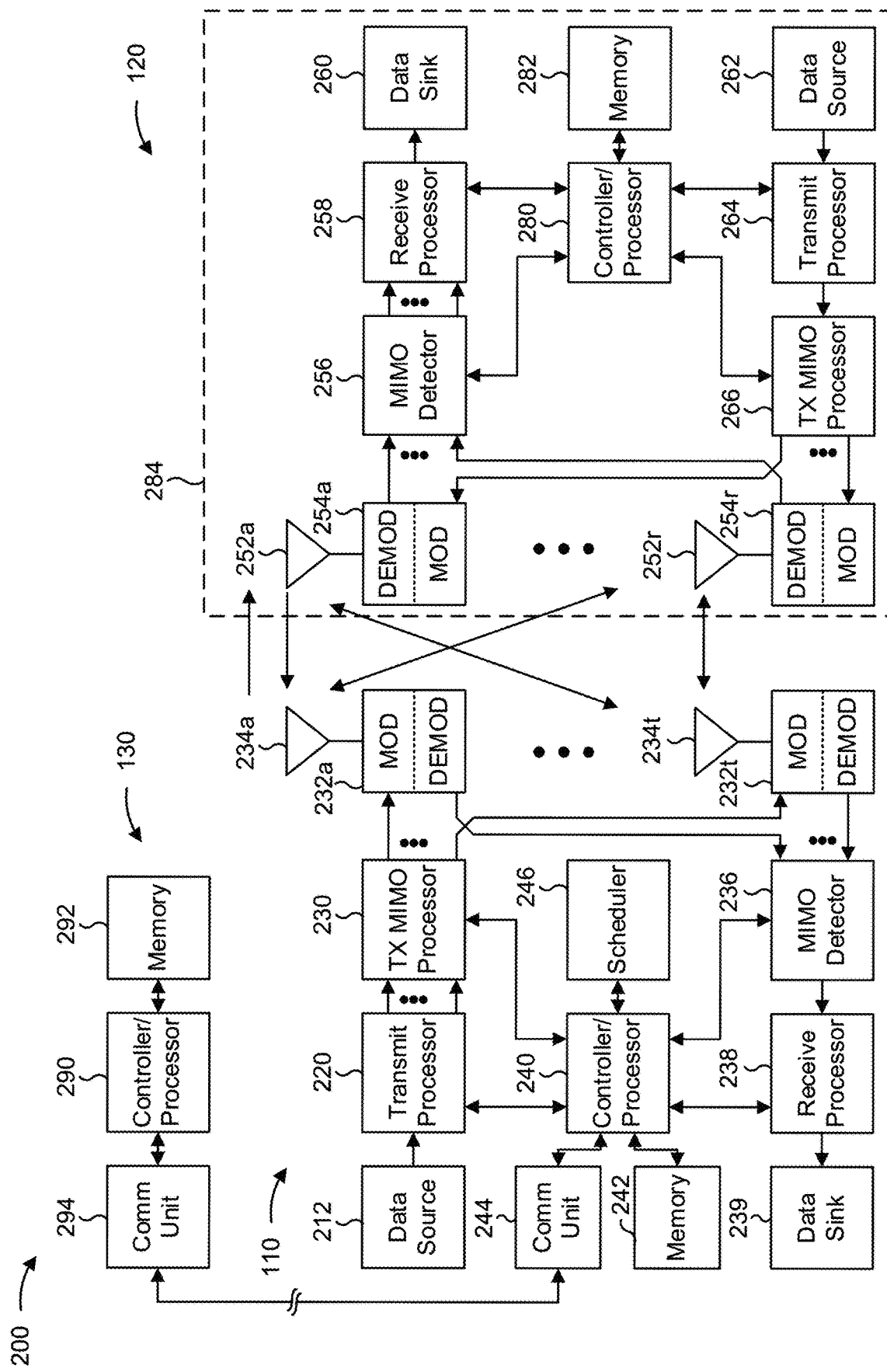
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5A-5B and/or FIG. 6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5A-5B and/or FIG. 6.

Controller/processor 240 of base station 110, controller/processor 280 of UE 120, and/or any other component(s) of FIG. 2 may perform one or more techniques associated with a joint MCS indication for downlink and uplink allocations in sub-band full-duplex, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions, among other examples.

In some aspects, the UE 120 includes means for receiving a single downlink control information (DCI) message scheduling a simultaneous downlink transmission and uplink transmission in an unpaired band, wherein the single DCI message includes an MCS field having one or more bits that indicate a first MCS for the downlink transmission; and/or means for determining a second MCS for the uplink transmission based at least in part on an offset from the first MCS for the downlink transmission. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for identifying a set of offset values based at least in part on the degree of duality between the uplink transmission and the downlink transmission, wherein the MCS field further includes one or more bits that indicate the offset among multiple configured offset values in the set of offset values.

In some aspects, the UE 120 includes means for determining a modulation order for the downlink transmission based at least in part on the first MCS for the downlink transmission; and/or means for determining that a modulation order for the uplink transmission is the same as the modulation order for the downlink transmission based at least in part on the one or more bits in the MCS field indicating the code rate for the uplink transmission.

In some aspects, the UE 120 includes means for determining a transport block size for the uplink transmission based at least in part on the code rate and the modulation order for the uplink transmission.

In some aspects, the UE 120 includes means for determining a transport block size for the downlink transmission based at least in part on the first MCS indicated in the MCS field of the single DCI message; and/or means for determining a transport block size for the uplink transmission based at least in part on the transport block size for the downlink transmission and a configured ratio between the transport block size for the uplink transmission and the transport block size for the downlink transmission.

In some aspects, the UE 120 includes means for determining a transport block size for the uplink transmission based at least in part on the first MCS indicated in the MCS field of the single DCI message; and/or means for determining a code rate for the uplink transmission based at least in part on the modulation order and the transport block size for the uplink transmission.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIGS. 3A-3C are diagrams illustrating examples 300, 310, 320 of full-duplex communication, in accordance with various aspects of the disclosure. As shown in FIGS. 3A-3C, examples 300, 310, 320 include one or more UEs 302 in communication with one or more base stations 304, TRPs 304, and/or the like in a wireless network that supports full-duplex communication. However, it will be appreciated that the devices shown in FIGS. 3A-3C are exemplary only, and that the wireless network may support full-duplex communication between other devices (e.g., between a UE and a base station or TRP, between a mobile termination node and a control node, between an integrated access and backhaul (IAB) child node and an IAB parent node, between a scheduled node and a scheduling node, and/or the like).

As shown in FIG. 3A, example 300 includes a UE 302 in communication with two base stations (e.g., TRPs) 304-1, 304-2. As shown in FIG. 3A, the UE 302 may transmit one or more uplink transmissions to base station 304-1 and may concurrently receive one or more downlink transmission from base station 304-2. Accordingly, in the example 300 shown in FIG. 3A, full-duplex communication is enabled for the UE 302, which may be operating as a full-duplex node, but not for the base stations 304-1, 304-2, which may be operating as half-duplex nodes. Additionally, or alternatively, as shown in FIG. 3B, example 310 includes two UEs, UE1 302-1 and UE2 302-2 in communication with a base station 304. In this case, the base station 304 may transmit one or more downlink transmissions to the UE1 302-1 and may concurrently receive one or more uplink transmissions from the UE2 302-2. Accordingly, in the example 310 shown in FIG. 3B, full-duplex communication is enabled for the base station 304, which may be operating as a full-duplex node, but not for the UE1 302-1 and UE2 302-2, which may be operating as half-duplex nodes. Additionally, or alternatively, as shown in FIG. 3C, example 320 includes a UE 302 in communication with a base station 304. In this case, the base station 304 may transmit, and the UE 302 may receive, one or more downlink transmissions concurrently with the UE 302 transmitting, and the base station 304 receiving, one or more uplink transmissions. Accordingly, in the example 320 shown in FIG. 3C, full-duplex communication is enabled for both the UE 302 and the base station 304, each of which is operating as a full-duplex node.

The present disclosure generally relates to improving the manner in which flexible time-division duplexing (TDD) operates to support full-duplex communication, which generally refers to simultaneous downlink and uplink transmissions in unpaired spectrum. In some aspects, flexible TDD capabilities that support full-duplex communication may be present at a scheduling node (e.g., a base station, a TRP, a control node, a parent node, and/or the like), a scheduled node (e.g., a UE, an MT node, a child node, and/or the like), or both. For example, at a UE, uplink transmission may be from one antenna panel and downlink reception may be in another antenna panel. In general, full-duplex communication may be conditional on beam separation of an uplink beam and a downlink beam at the respective antenna panels in order to minimize self-interference that may occur when a transmitted signal leaks into a receive port, when an object reflects a transmitted signal back to a receive port (e.g., causing a clutter echo effect), and/or the like. Accordingly, improving the manner in which transmission parameters are determined or otherwise configured for the uplink beam and the downlink beam are selected to enable full-duplex communication is desirable. Utilizing full-duplex communication may provide reduced latency by allowing a full-duplex node to transmit or receive a downlink signal in an uplink-only slot, or to transmit or receive an uplink signal in a downlink-only slot, and/or the like. In addition, full-duplex communication may enhance spectral efficiency or throughput per cell or per UE, may enable more efficient resource utilization by simultaneously utilizing time and frequency resources for downlink and uplink communication, and/or the like.

As indicated above, FIGS. 3A-3C are provided as one or more examples. Other examples may differ from what is described with regard to FIGS. 3A-3C.

Figure 4:
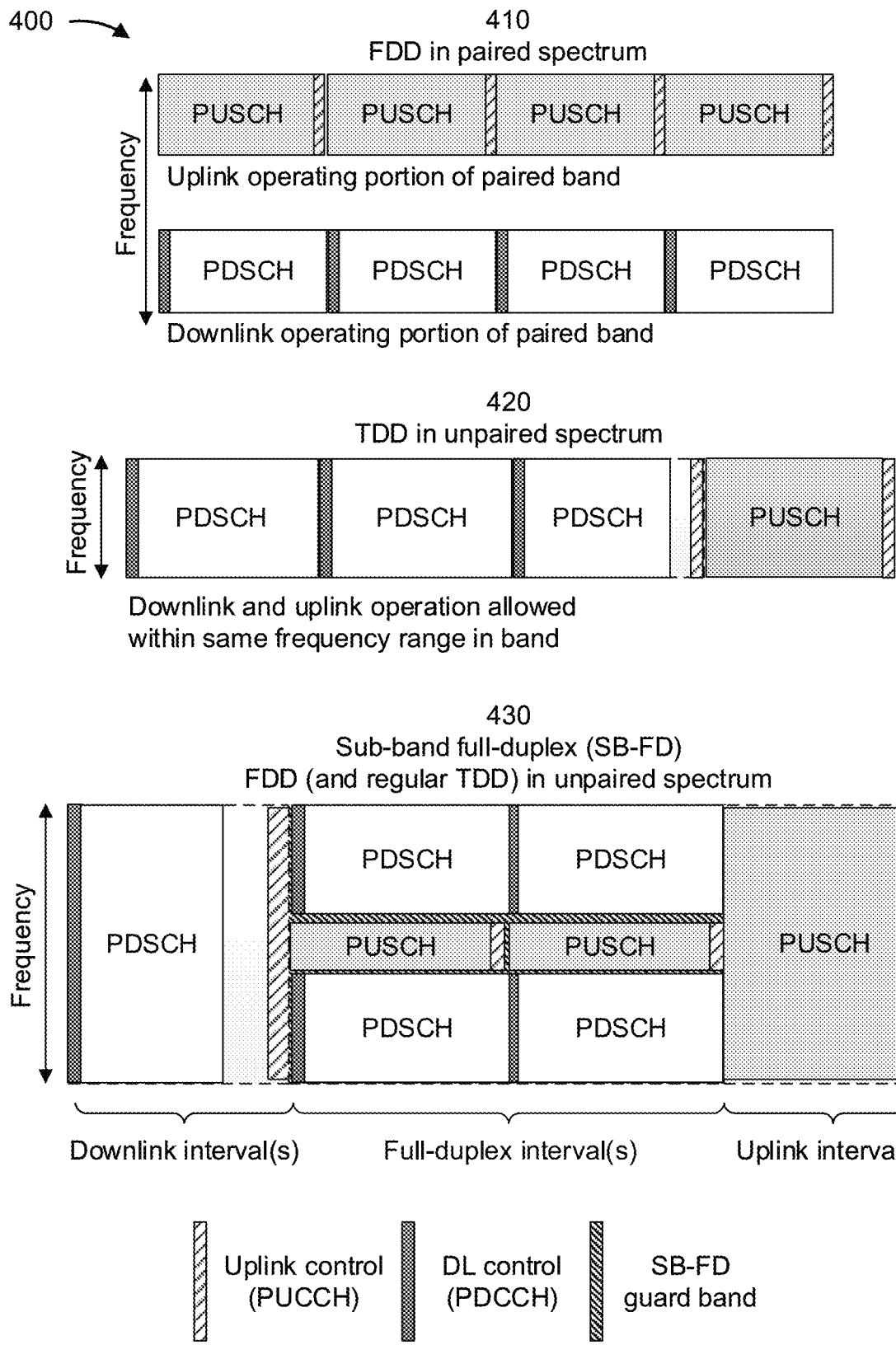
FIG. 4 is a diagram illustrating examples of paired spectrum and unpaired spectrum, in accordance with various aspects of the disclosure.

FIG. 4 is a diagram illustrating examples 400 of paired spectrum and unpaired spectrum, in accordance with various aspects of the disclosure. In particular, as described herein, a wireless communication standard or governing body may specify how a wireless spectrum is to be used. For example, 3GPP may specify how wireless spectrum is to be used for the 5G/NR radio access technology and interface. As an example, a specification may indicate whether a band is to be used as paired spectrum (e.g., in a frequency division duplexing (FDD) mode) or as unpaired spectrum (e.g., in a time division duplexing (TDD) mode).

For example, as shown by reference number 410, a band in a paired spectrum may use a first frequency region (or channel) for uplink communication and a second frequency region (or channel) for downlink communication. In such cases, the frequency regions or channels used for uplink communication and downlink communication do not overlap, and the frequency regions used for uplink communication and downlink communication have sufficient separation to prevent interference between the downlink and uplink communication. For example, a paired band may have an uplink operating band and a downlink operating band that are configured to use non-overlapped frequency regions separated by a guard band. Accordingly, in paired spectrum, a UE that has full-duplex capabilities may perform simultaneous transmit and receive operations using the separate frequency regions or channels that are allocated to downlink and uplink communication. Examples of paired bands in NR include NR operating bands n1, n2, n3, n5, n7, n8, n12, n20, n25, and n28, as specified by 3GPP Technical Specification (TS) 38.101-1.

Alternatively, as shown by reference number 420, an unpaired band may allow downlink and uplink operation within a same frequency region (e.g., a same operating band). For example, an unpaired band may configure an uplink operating band and a downlink operating band in the same frequency range. Some deployments may use TDD in the unpaired band, whereby some time intervals (e.g., symbols, slots, and/or the like) are used for uplink communication only and other time intervals are used for downlink communication only. In this case, substantially the entire bandwidth of a component carrier may be used for a downlink communication or an uplink communication, depending on whether the communication is performed in a downlink slot, an uplink slot, or a special slot (in which downlink or uplink communications can be scheduled). Examples of unpaired bands include NR operating bands n40, n41, and n50, as specified by 3GPP TS 38.101-1. In some cases, however, using TDD in unpaired spectrum may be inefficient. For example, uplink transmit power may be limited, meaning that UEs may be incapable of transmitting with enough power to efficiently utilize the full bandwidth of an uplink slot. This may be particularly problematic in large cells at the cell edge. Furthermore, using TDD may introduce latency relative to a full-duplex scheme in which uplink communications and downlink communications can be performed in the same time interval, since TDD restricts usage of a given time interval to uplink or downlink communication only.

Accordingly, as shown by reference number 430, an unpaired band may be configured in a sub-band full-duplex (SB-FD) mode in order to enable FDD operation and/or TDD operation in unpaired spectrum. For example, as shown in FIG. 4, an unpaired band configured in the SB-FD mode may associate time intervals with downlink communication only, uplink communication only, or both downlink and uplink communication. Each time interval may be associated with a control region, which is illustrated as a portion of a time interval with a diagonal fill for uplink control (e.g., a physical uplink control channel (PUCCH)) or a darker-shaded fill for downlink control (e.g., a physical downlink control channel (PDCCH)). Additionally, or alternatively, each time interval may be associated with a data region, which is shown as a physical downlink shared channel (PDSCH) for downlink frequency regions or a physical uplink shared channel (PUSCH) for uplink frequency regions.

In some aspects, an unpaired band configured in the SB-FD mode may include one or more full-duplex time intervals (e.g., symbols, slots, slot groups, subframes, subslots, mini-slots, and/or the like) that are associated with an FDD configuration. For example, as shown in FIG. 4, the FDD configuration associated with a full-duplex time interval may indicate one or more downlink frequency regions (or sub-bands) and one or more uplink frequency regions (or sub-bands) that are separated by a guard band. Accordingly, an FDD configuration may divide an unpaired band (e.g., one or more component carriers of an unpaired band) into uplink frequency regions, downlink frequency regions, and/or other regions (e.g., guard bands and/or the like), which may enable a UE with full-duplex capabilities to perform simultaneous transmit and receive operations during one or more time intervals that are divided into downlink and uplink sub-bands with a guard band separation to prevent the uplink transmission from causing self-interference with downlink reception. In some aspects, the FDD configuration may identify bandwidth part configurations corresponding to the uplink frequency regions and the downlink frequency regions. For example, a respective bandwidth part may be configured for each uplink frequency region and each downlink frequency region.

In some aspects, the usage of SB-FD (also referred to as FDD in unpaired spectrum, in-band full-duplexing (IB-FD), and/or the like) may increase throughput and improve spectral efficiency, and may enable the usage of an always-on uplink (e.g., for ultra reliable low latency communication (URLLC) control channels). Furthermore, the usage of SB-FD or FDD in unpaired spectrum may improve utilization or reliability of uplink resources, because a given UE typically cannot utilize the full uplink bandwidth when transmitting without increasing power spectral density and thereby causing reduced signal-to-noise ratio (SNR) at a receiver (e.g., a base station). In this way, configuring SB-FD or FDD in unpaired spectrum may reduce latency by providing more uplink transmission opportunities, may enhance spectral efficiency or throughput, may enable more efficient resource utilization by simultaneously utilizing time and frequency resources for downlink and uplink communication, and/or the like. However, scheduling simultaneous downlink and uplink transmissions in unpaired spectrum is associated with various inefficiencies.

For example, in a wireless network, such as an LTE network, an NR network, and/or the like, dynamic downlink and uplink allocations are provided in separate PDCCH grants (e.g., separate downlink control information (DCI) messages). For example, separate PDCCH grants are typically used because downlink and uplink allocations are in different bandwidth parts (e.g., in paired spectrum) and/or in different time intervals (e.g., in unpaired spectrum). Accordingly, separate PDCCH grants are used because the downlink and uplink allocations may be associated with different interference profiles. Furthermore, providing a single DCI message with a joint downlink and uplink allocation would significantly increase the DCI size, and thereby increase signaling overhead, increase decoding complexity, and/or the like. However, in SB-FD operation, a UE can be scheduled to simultaneously receive a downlink transmission (e.g., a PDSCH) and transmit an uplink transmission (e.g., a PUSCH) within the same channel or bandwidth part during one or more time intervals that fully or partially overlap in time. Accordingly, in SB-FD operation, one or more downlink and uplink transmission parameters may be correlated.

Some aspects described herein relate to techniques and apparatuses to provide a joint downlink and uplink allocation in a single DCI message in SB-FD operation (e.g., when using FDD in unpaired spectrum). For example, in some aspects, a base station may transmit, and a UE may receive, a single DCI message that schedules simultaneous downlink and uplink transmissions (e.g., downlink and uplink transmissions that fully or partially overlap in time). The single DCI message may include an MCS field that indicates at least a downlink MCS to be used for downlink reception. Accordingly, an uplink MCS to be used for uplink transmission may be determined based at least in part on the downlink MCS indicated in the MCS field of the single DCI message. For example, in some aspects, the uplink MCS may be determined as an offset relative to the downlink MCS, and the offset may be preconfigured, indicated in the MCS field of the single DCI message, implicitly determined according to a duality between the uplink transmission and the downlink transmission, and/or the like. Additionally, or alternatively, in some aspects, the single DCI message may indicate a code rate or a modulation order for the uplink transmission, and the UE may determine one or more other uplink transmission parameters (e.g., a transport block size and/or the like) according to the downlink MCS indicated in the MCS field of the single DCI message. In this way, a single DCI message can jointly indicate transmission parameters for simultaneous downlink and uplink transmissions in unpaired spectrum, which reduces signaling overhead, ensures that the transmission parameters for simultaneous downlink and uplink transmissions are correlated, and/or the like.

As indicated above, FIG. 4 is provided as one or more examples. Other examples may differ from what is described with regard to FIG. 4.

Figure 5A:
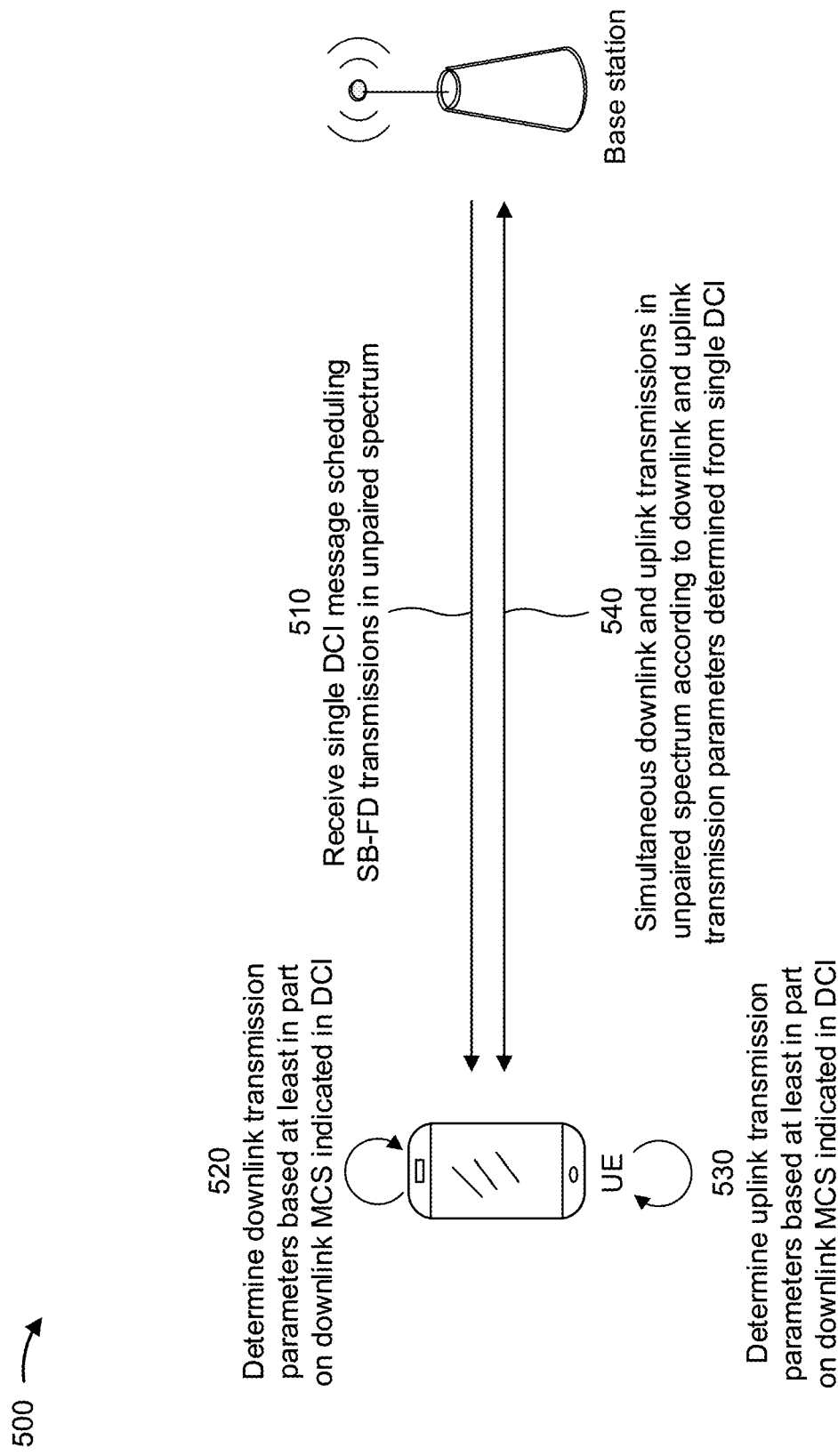
FIGS. 5A-5B are diagrams illustrating one or more examples associated with a joint modulation and coding scheme (MCS) indication for downlink and uplink allocations in sub-band full-duplex, in accordance with various aspects of the present disclosure.
Figure 5B:
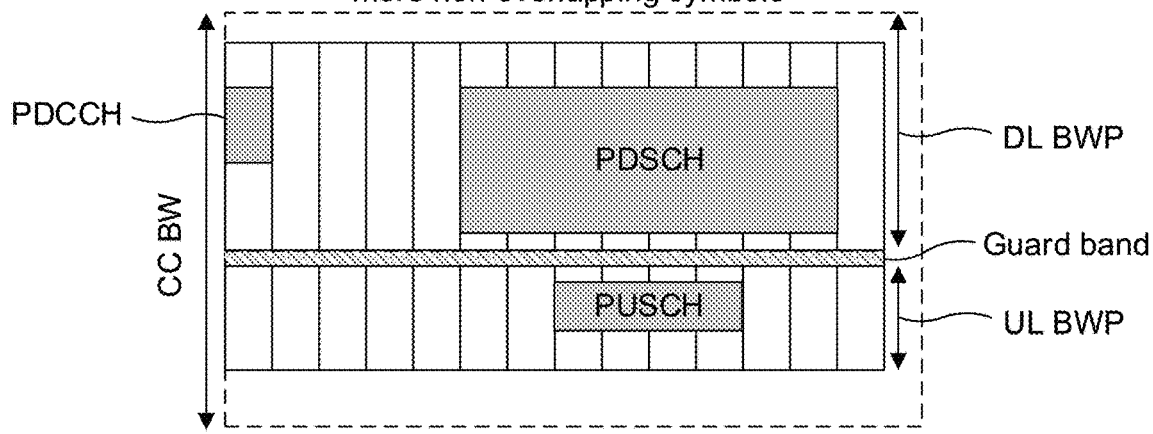
Figure 5B:
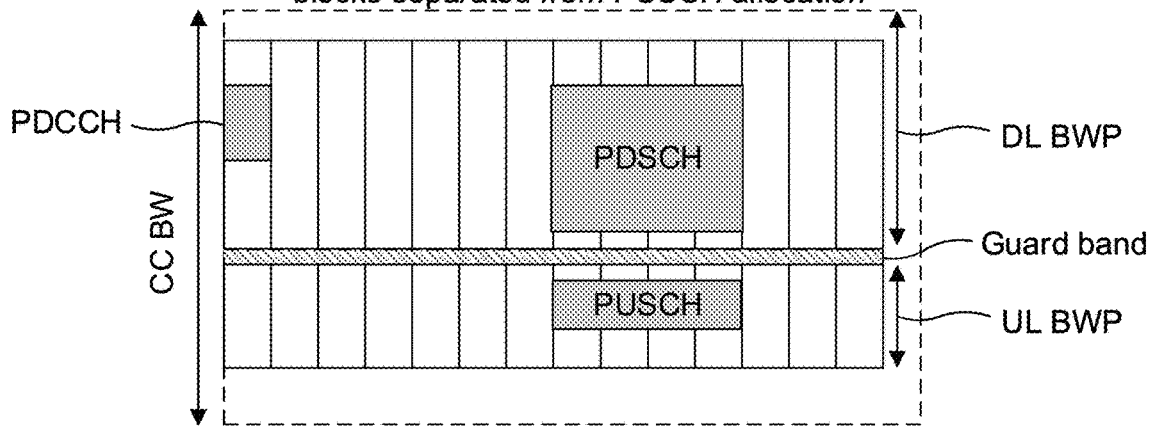
Figure 5B:
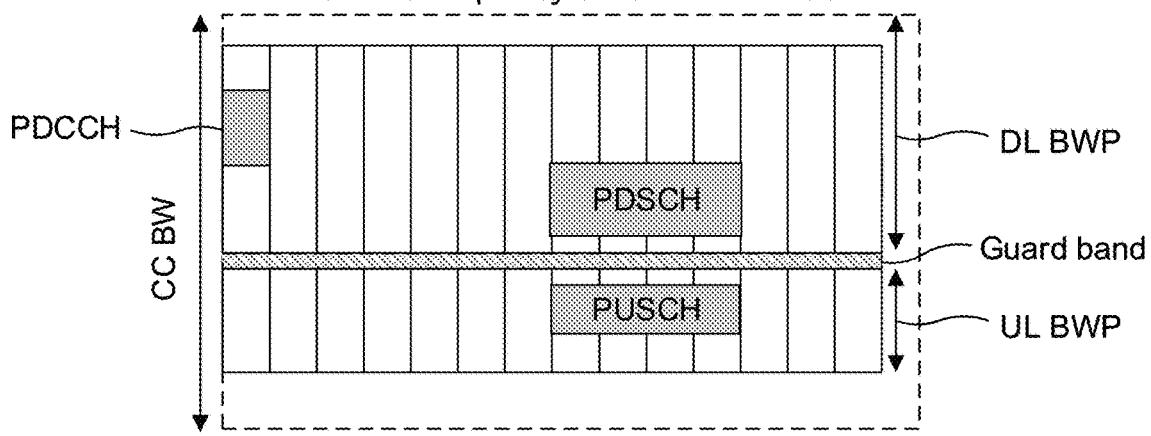

FIGS. 5A-5B are diagrams illustrating one or more examples 500 associated with a joint MCS indication for downlink and uplink allocations in SB-FD, in accordance with various aspects of the present disclosure. As shown in FIG. 5A, example(s) 500 may include a UE (e.g., UE 120, UE 302, and/or the like) in communication with a base station (e.g., base station 110, TRP 110, and/or the like) in a wireless network (e.g., wireless network 100). In some aspects, as described herein, the UE and the base station may communicate in an SB-FD mode, whereby the base station may provide the UE with an FDD configuration that enables the UE to simultaneously transmit and receive in one or more time intervals in unpaired spectrum.

As shown in FIG. 5A, and by reference number 510, the base station may transmit, and the UE may receive, a single DCI message that schedules SB-FD transmissions in unpaired spectrum. For example, in some aspects, the single DCI message may schedule one or more downlink transmissions (e.g., one or more PDSCH communications) to the UE and one or more uplink transmissions (e.g., one or more PUSCH communications) by the UE in one or more time intervals that at least partially overlap in time. Furthermore, as described above, the downlink transmission(s) and the uplink transmission(s) may be scheduled in different sub-bands of the unpaired spectrum, with a guard band separating the sub-band(s) allocated to the downlink transmission(s) from the sub-band(s) allocated to the downlink transmission(s). Furthermore, as described in further detail below, the DCI message may include an MCS field to jointly indicate one or more transmission parameters for the downlink transmission(s) and one or more transmission parameters for the uplink transmission(s). For example, in some aspects, the single DCI message may be associated with a fallback DCI format or a non-fallback DCI format with a five-bit MCS field used to jointly indicate the transmission parameter(s) for the downlink and uplink transmissions. Additionally, or alternatively, the single DCI message could be associated with DCI format 0_2 or 1_2, in which case the MCS field may have a flexible bit width that is not fixed to a particular number of bits (e.g., allowing the MCS field to have five (5) bits, more than five bits, or fewer than five bits).

As further shown in FIG. 5A, and by reference number 520, the UE may determine one or more downlink transmission parameters based at least in part on a downlink MCS that is indicated in the MCS field of the DCI message. For example, in some aspects, one or more most significant bits or one or more least significant bits in the MCS field may indicate the downlink MCS, and the UE may use the downlink MCS to determine various transmission parameters for the downlink transmission(s). For example, the one or more most significant bits or one or more least significant bits in the MCS field may indicate an index for the downlink MCS, which may be associated with a particular transport block size, modulation order (e.g., QPSK, 16QAM, 64QAM, and/or the like), code rate, and/or the like. In some aspects, the relationship between the index for the downlink MCS and other transmission parameters such as transport block size, modulation order, code rate, and/or the like may be defined in a table stored in a memory of the UE, a wireless communication standard, and/or the like.

As further shown in FIG. 5A, and by reference number 530, the UE may determine one or more transmission parameters for the uplink transmission scheduled by the DCI message based at least in part on the downlink MCS indicated in the DCI message. For example, in some aspects, the UE may determine an uplink MCS to be used for the uplink transmission based at least in part on an offset from the downlink MCS. In general, the offset may be an integer with a negative value, a zero (or null) value, or a positive value. Accordingly, the UE may generally add the offset to the index for the downlink MCS to determine the uplink MCS, and thereby determine other transmission parameters such as a transport block size, modulation order, code rate, and/or the like for the uplink transmission. For example, in some aspects, the uplink MCS may have a configured offset relative to the downlink MCS, in which case the MCS field of the single DCI message includes zero (0) bits that are used to indicate the uplink transmission parameters (e.g., the single DCI message can jointly indicate the downlink and uplink MCS without increasing the DCI size).

Additionally, or alternatively, the UE may be configured with a set of candidate offset values, and the MCS field of the DCI message may include one or more bits to indicate a particular offset in the set of candidate offset values. For example, if the set of candidate offset values includes four possible offsets (e.g., {−3, 0, 3, 5}), the MCS field may include two (2) bits to indicate one of the offset values in the set. In other examples, the MCS field may include one (1) bit to indicate one of the offset values in a set having two candidate offset values, three (3) bits to indicate one of the offset values in a set having eight candidate offset values, and/or the like.

Additionally, or alternatively, the UE may implicitly determine the exact offset value within the set of candidate offset values based at least in part on a degree of duality between resource allocations associated with the downlink and uplink transmissions (e.g., a number of downlink and uplink symbols that are overlapping and/or non-overlapping in time, a frequency separation between resource blocks allocated to the downlink transmission and resource blocks allocated to the uplink transmission, and/or the like). For example, the downlink MCS and the uplink MCS may be closer to one another (e.g., the offset may have a smaller absolute value) when the downlink transmission and the uplink transmission do not overlap in time. Alternatively, in cases where the downlink transmission and the uplink transmission fully or partially overlap in time, the offset may depend on factors such as capabilities of the UE and/or the base station to suppress self-interference, a size of the guard band separating the downlink sub-band(s) from the uplink sub-band(s), and/or the like.

For example, FIG. 5B illustrates various examples 532, 534, 536 of different resource allocations for a downlink transmission (e.g., a PDSCH) and an uplink transmission (e.g., a PUSCH) that at least partially overlap in time. In examples 532, 534, 536, a component carrier bandwidth is divided into a downlink bandwidth part and an uplink bandwidth part that are separated in frequency by a guard band. Furthermore, in examples 532, 534, 536, the downlink transmission and the uplink transmission are allocated different sets of resource blocks (e.g., time and frequency resources). In the case of example 532, the downlink transmission is allocated one or more resource blocks that occupy symbols that are non-overlapping with resource blocks allocated to the uplink transmission. Accordingly, the uplink transmission may cause self-interference with downlink reception during the overlapping symbols, but there may be no self-interference with the downlink transmission during the symbols that are non-overlapping with the resource blocks allocated to the uplink transmission.

In contrast, in the case of example 534 and example 536, the downlink (PDSCH) allocation fully overlaps in time with the uplink (PUSCH) allocation, whereby self-interference occurs during all of the symbols in which the downlink transmission is scheduled (e.g., examples 534 and 536 are both associated with more self-interference than example 532). However, in the case of example 534, relative to example 536, the downlink allocation includes some resource blocks that are comparatively farther away from the resource blocks associated with the uplink allocation. Accordingly, because self-interference generally decreases as the frequency separation between the uplink allocation and the downlink allocation increases, example 534 may be associated with less self-interference than example 536, where all of the resource blocks in the downlink allocation are relatively close (in frequency) to the resource blocks in the uplink allocation. Accordingly, assuming that the downlink and uplink allocations in examples 532, 534, 536 are associated with a similar inter-cell interference profile, a delta between the downlink MCS and the uplink MCS (e.g., an absolute value of the offset between the downlink MCS and the uplink MCS) may be the highest in the case of example 532, and the delta may be the lowest in the case of example 536. Furthermore, while examples 532, 534, 536 in FIG. 5B illustrate downlink and uplink resource allocations that at least partially overlap in time, in some cases, the downlink and uplink resource allocations may overlap in frequency. For example, in an extreme case, the downlink resource allocation may be as wide as the component carrier bandwidth, and the uplink resource allocation may cover only a portion of the component carrier bandwidth. In this case, where there is no guard band separating the downlink and uplink resource allocations, the uplink transmission may cause self-interference with downlink reception over the entire uplink resource allocation and in resource blocks that are close to the uplink resource allocation in time and/or frequency, which may result in a delta between the downlink MCS and the uplink MCS being lower than the cases of examples 532, 534, and 536 to mitigate self-interference.

Additionally, or alternatively, the UE may determine the exact offset value within a set of candidate offset values according to a combination of implicit and explicit approaches. For example, in some aspects, the UE may be configured with multiple sets of candidate offset values, and the multiple sets of candidate offset values may be associated with different degrees of duality between resource allocations associated with downlink and uplink transmissions. Accordingly, in this case, the UE may determine one of the multiple sets of candidate offset values applicable to the downlink and uplink transmissions scheduled by the DCI based at least in part on the number of downlink and uplink symbols that are non-overlapping in time, a frequency separation between resource blocks associated with the downlink and uplink allocations, capabilities of the UE and/or the base station to suppress self-interference, a size of the guard band separating the downlink and uplink sub-bands, and/or the like. In this case, the MCS field of the single DCI may include one or more bits to indicate the exact offset within the set of candidate offset values implicitly determined to be applicable to the downlink and uplink transmissions scheduled by the DCI.

In some aspects, the UE may alternatively determine the transmission parameters for the uplink transmission based at least in part on an uplink code rate or an uplink modulation order in combination with the downlink MCS indicated in the DCI scheduling the simultaneous downlink and uplink transmissions in the unpaired spectrum. For example, as described above, the MCS field may include one or more most significant bits or least significant bits that indicate the downlink MCS, which is associated with a downlink transport block size, a downlink modulation order, a downlink code rate, and/or the like. Furthermore, in some aspects, the MCS field may include one or more additional bits to indicate the uplink code rate. For example, the UE may be configured with a set of uplink code rates that are applicable to SB-FD operation, and the one or more additional bits may correspond to a codepoint used to indicate an uplink code rate in the set (e.g., the MCS field may include two (2) bits to indicate an uplink code rate from a set of four code rates, such as $\{⅓, ½, ⅔, 0.9\}$). Furthermore, in cases where the MCS field indicates the uplink code rate, the UE may determine that the uplink modulation order is to be the same as the downlink modulation order, which the UE may determine based at least in part on the downlink MCS indicated in the MCS field of the DCI. Accordingly, given the uplink code rate indicated in the MCS field of the DCI and the uplink modulation order that corresponds to the downlink modulation order associated with the downlink MCS indicated in the MCS field, the UE may determine the uplink transport block size (e.g., using a table stored in a memory of the UE, a wireless communication standard, and/or the like).

Alternatively, in some aspects, the one or more additional bits in the MCS field may be used to indicate the uplink modulation order. For example, the UE may be configured with a set of uplink modulation orders that are applicable to SB-FD operation (e.g., QPSK, 16QAM, 64QAM, and/or the like), and the one or more additional bits may correspond to a codepoint used to indicate an uplink modulation order in the set (e.g., the MCS field may include one (1) bit to indicate an uplink modulation order from a set limited to two options, such as {QPSK, 16QAM}). Furthermore, in this case, the UE may determine the uplink transport block size as a portion of the downlink transport block size, which the UE can determine based at least in part on the downlink MCS indicated in the MCS field of the DCI. For example, in some aspects, the UE may be configured with a value indicating a ratio of the uplink transport block size to the downlink transport block size (e.g., by radio resource control (RRC) or other higher-layer signaling), whereby the UE may determine the uplink transport block size according to the downlink transport block size and the higher-layer configured ratio between the uplink transport block size and the downlink transport block size. In this case, given the uplink modulation order indicated by the MCS field of the DCI and the uplink transport block size that is calculated from the downlink transport block size and the higher-layer configured transport block size ratio, the UE may determine the uplink code rate (e.g., using a table stored in a memory of the UE, a wireless communication standard, and/or the like). Alternatively, in some aspects, the uplink modulation order may be configured (e.g., not indicated in the MCS field of the DCI), in which case the UE may be able to determine the uplink code rate from the configured uplink modulation order and the uplink transport block size that is derived from the downlink MCS and the higher-layer configured ratio.

As further shown in FIG. 5A, and by reference number 540, the UE may perform simultaneous downlink and uplink transmissions in the unpaired spectrum according to the downlink and uplink transmission parameters that are determined from the MCS field in the single DCI. For example, in some aspects, the base station may transmit, and the UE may receive, a downlink transmission having a modulation order, code rate, transport block size, and/or the like that are associated with a downlink MCS indicated in the MCS field of the single DCI. Furthermore, the UE may transmit, and the base station may receive, an uplink transmission having a modulation order, code rate, transport block size, and/or the like that are associated with an uplink MCS determined as an offset from the downlink MCS indicated in the MCS field of the single DCI. Additionally, or alternatively, the uplink transmission parameters (e.g., modulation order, code rate, transport block size, and/or the like) may be determined from an uplink code rate indicated in the MCS field of the single DCI, an uplink modulation order indicated in the MCS field of the single DCI, a configured value for the uplink modulation order, a downlink transport block size associated with the downlink MCS indicated in the MCS field of the single DCI, a configured ratio between the uplink transport block size and the downlink transport block size, and/or the like.

As indicated above, FIGS. 5A-5B are provided as one or more examples. Other examples may differ from what is described with regard to FIGS. 5A-5B.

Figure 6:
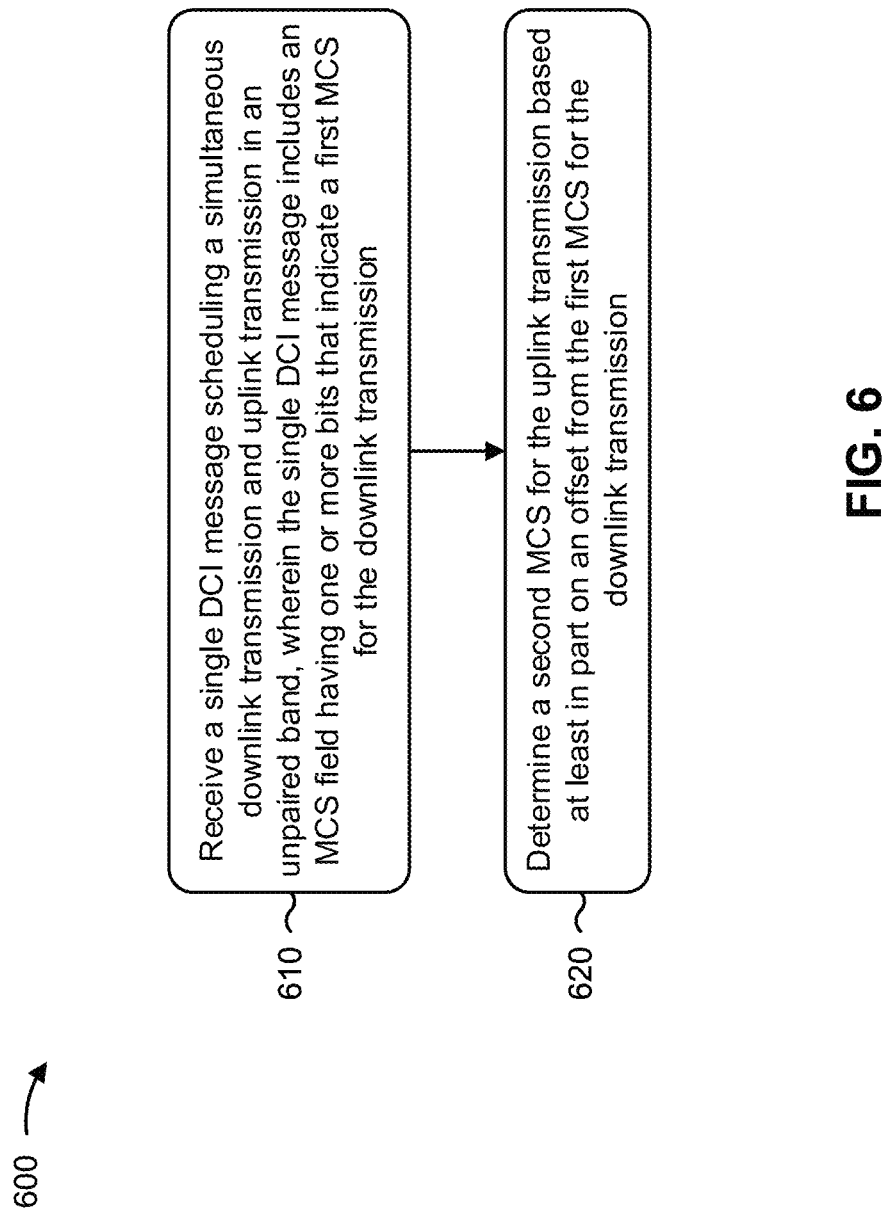
FIG. 6 is a diagram illustrating an example process associated with a joint MCS indication for downlink and uplink allocations in sub-band full-duplex, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120, UE 302, and/or the like) performs operations associated with a joint MCS indication for downlink and uplink allocations in sub-band full-duplex.

As shown in FIG. 6, in some aspects, process 600 may include receiving a single DCI message scheduling a simultaneous downlink transmission and uplink transmission in an unpaired band, wherein the single DCI message includes an MCS field having one or more bits that indicate a first MCS for the downlink transmission (block 610). For example, the UE may receive (e.g., using antenna 252, DEMOD 254, MIMO detector 256, receive processor 258, controller/processor 280, memory 282, and/or the like) a single DCI message scheduling a simultaneous downlink transmission and uplink transmission in an unpaired band, as described above in connection with FIGS. 5A-5B. In some aspects, the single DCI message includes an MCS field having one or more bits that indicate a first MCS for the downlink transmission.

As further shown in FIG. 6, in some aspects, process 600 may include determining a second MCS for the uplink transmission based at least in part on an offset from the first MCS for the downlink transmission (block 620). For example, the UE may determine (e.g., using controller/processor 280, memory 282, and/or the like) a second MCS for the uplink transmission based at least in part on an offset from the first MCS for the downlink transmission, as described above in connection with FIGS. 5A-5B.

Process 600 may include additional aspects, such as any single aspect or any combination of aspects described below and/or in connection with one or more other processes described elsewhere herein.

In a first aspect, the one or more bits that indicate the first MCS for the downlink transmission correspond to one or more most significant bits or one or more least significant bits in the MCS field of the single DCI message.

In a second aspect, alone or in combination with the first aspect, the offset has a configured value relative to the first MCS for the downlink transmission.

In a third aspect, alone or in combination with one or more of the first and second aspects, the MCS field further includes one or more bits that dynamically indicate the offset among multiple configured offset values.

In a fourth aspect, alone or in combination with one or more of the first through third aspects, the offset is based at least in part on a degree of duality between the uplink transmission and the downlink transmission.

In a fifth aspect, alone or in combination with one or more of the first through fourth aspects, the degree of duality between the uplink transmission and the downlink transmission is based at least in part on a number of downlink and uplink symbols that are non-overlapping in time.

In a sixth aspect, alone or in combination with one or more of the first through fifth aspects, the degree of duality between the uplink transmission and the downlink transmission is based at least in part on a frequency separation between resource blocks allocated to the downlink transmission and resource blocks allocated to the uplink transmission.

In a seventh aspect, alone or in combination with one or more of the first through sixth aspects, process 600 includes identifying a set of offset values based at least in part on the degree of duality between the uplink transmission and the downlink transmission, and the MCS field further includes one or more bits that indicate the offset among multiple configured offset values in the set of offset values.

In an eighth aspect, alone or in combination with one or more of the first through seventh aspects, the MCS field further includes one or more bits that indicate a code rate for the uplink transmission among multiple code rates in a set of code rates configured for sub-band full-duplex operation.

In a ninth aspect, alone or in combination with one or more of the first through eighth aspects, process 600 includes determining a modulation order for the downlink transmission based at least in part on the first MCS for the downlink transmission, and determining that a modulation order for the uplink transmission is the same as the modulation order for the downlink transmission based at least in part on the one or more bits in the MCS field indicating the code rate for the uplink transmission.

In a tenth aspect, alone or in combination with one or more of the first through ninth aspects, process 600 includes determining a transport block size for the uplink transmission based at least in part on the code rate and the modulation order for the uplink transmission.

In an eleventh aspect, alone or in combination with one or more of the first through tenth aspects, process 600 includes determining a transport block size for the downlink transmission based at least in part on the first MCS indicated in the MCS field of the single DCI message, and determining a transport block size for the uplink transmission based at least in part on the transport block size for the downlink transmission and a configured ratio between the transport block size for the uplink transmission and the transport block size for the downlink transmission.

In a twelfth aspect, alone or in combination with one or more of the first through eleventh aspects, the MCS field further includes one or more bits that indicate a modulation order for the uplink transmission among multiple modulation orders in a set of modulation orders configured for sub-band full-duplex operation.

In a thirteenth aspect, alone or in combination with one or more of the first through twelfth aspects, process 600 includes determining a transport block size for the uplink transmission based at least in part on the first MCS indicated in the MCS field of the single DCI message, and determining a code rate for the uplink transmission based at least in part on the modulation order and the transport block size for the uplink transmission.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
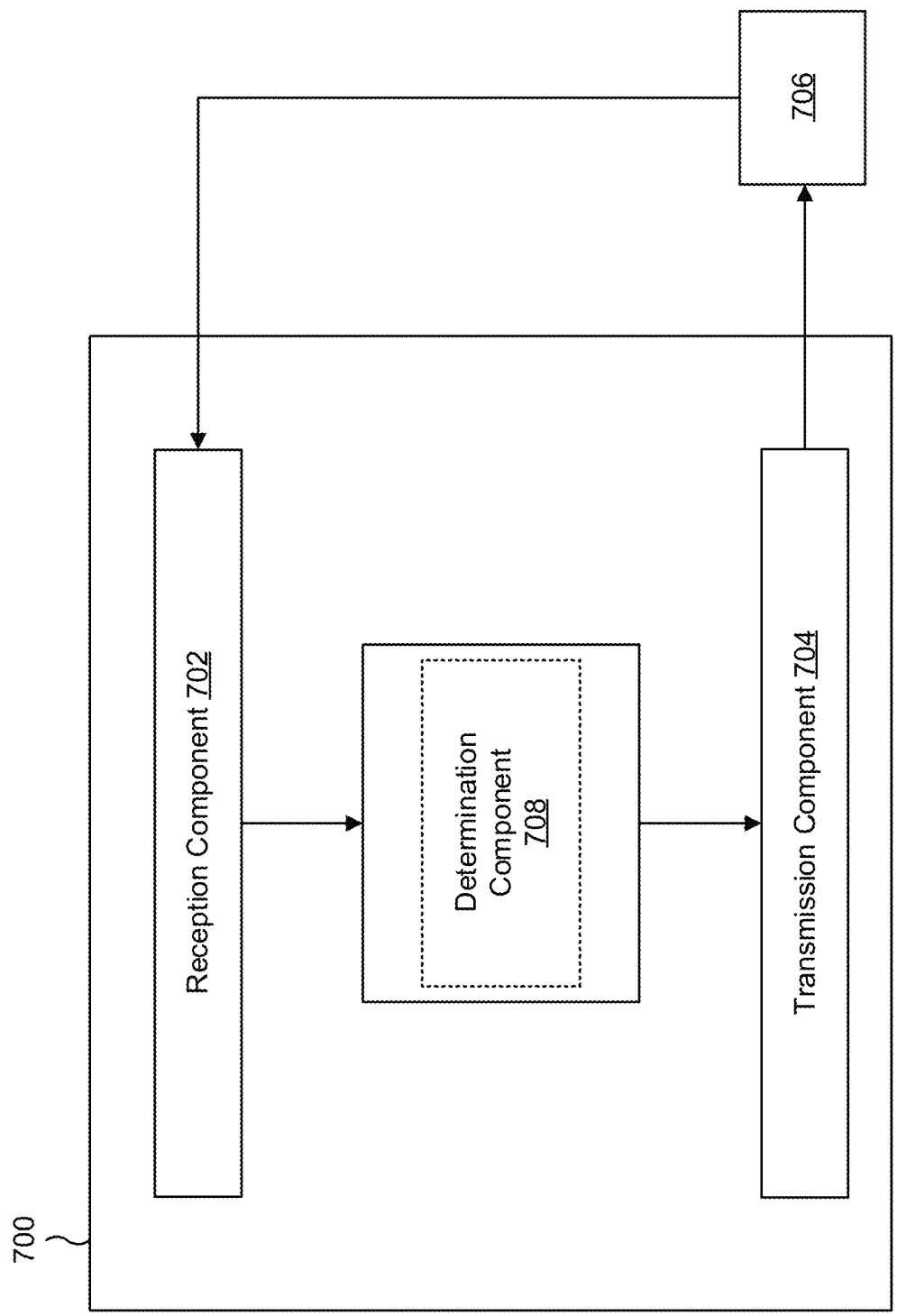
FIG. 7 is a block diagram of an example apparatus for wireless communication, in accordance with various aspects of the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (e.g., a base station, another UE, or another wireless communication device) using the reception component 702 and the transmission component 704. As further shown, the apparatus 706 may include a determination component 708, among other examples.

In some aspects, the apparatus 700 may be configured to perform one or more operations described herein in connection with FIGS. 5A-5B. Additionally or alternatively, the apparatus 700 may be configured to perform one or more processes described herein, such as process 600 of FIG. 6.

In some aspects, the apparatus 700 and/or one or more components shown in FIG. 7 may include one or more components of the UE 120 described above in connection with FIG. 2. Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (e.g., filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE 120 described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE 120 described above in connection with FIG. 2. In some aspects, the transmission component 704 may be co-located with the reception component 702 in a transceiver.

In some aspects, as described herein, the reception component 702 may receive a single DCI message (e.g., from the apparatus 706) scheduling a simultaneous downlink transmission and uplink transmission in an unpaired band. For example, in some aspects, the single DCI message may include an MCS field that has one or more bits to indicate a first MCS for the downlink transmission. In some aspects, the determination component 708 may determine a second MCS for the uplink transmission based at least in part on an offset from the first MCS for the downlink transmission. Accordingly, in some aspects, the reception component 702 may receive the downlink transmission based at least in part on the first MCS for the downlink transmission, and the transmission component 704 may transmit the uplink transmission based at least in part on the second MCS for the uplink transmission. In some aspects, the determination component 708 may include a controller/processor, a memory, or a combination thereof, of the UE 120 described above in connection with FIG. 2.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The following provides an overview of some aspects of the present disclosure:

Aspect 1: A method of wireless communication performed by a UE, comprising: receiving a single DCI message scheduling a simultaneous downlink transmission and uplink transmission in an unpaired band, wherein the single DCI message includes an MCS field having one or more bits that indicate a first MCS for the downlink transmission; and determining a second MCS for the uplink transmission based at least in part on an offset from the first MCS for the downlink transmission.

Aspect 2: The method of aspect 1, wherein the one or more bits that indicate the first MCS for the downlink transmission correspond to one or more most significant bits or one or more least significant bits in the MCS field of the single DCI message.

Aspect 3: The method of any of aspects 1-2, wherein the offset has a configured value relative to the first MCS for the downlink transmission.

Aspect 4: The method of any of aspects 1-3, wherein the MCS field further includes one or more bits that dynamically indicate the offset among multiple configured offset values.

Aspect 5: The method of any of aspects 1-4, wherein the offset is based at least in part on a degree of duality between the uplink transmission and the downlink transmission.

Aspect 6: The method of aspect 5, wherein the degree of duality between the uplink transmission and the downlink transmission is based at least in part on a number of downlink and uplink symbols that are non-overlapping in time.

Aspect 7: The method of any of aspects 5-6, wherein the degree of duality between the uplink transmission and the downlink transmission is based at least in part on a frequency separation between resource blocks allocated to the downlink transmission and resource blocks allocated to the uplink transmission.

Aspect 8: The method of any of aspects 5-7, further comprising: identifying a set of offset values based at least in part on the degree of duality between the uplink transmission and the downlink transmission, wherein the MCS field further includes one or more bits that indicate the offset among multiple configured offset values in the set of offset values.

Aspect 9: The method of any of aspects 1-8, wherein the MCS field further includes one or more bits that indicate a code rate for the uplink transmission among multiple code rates in a set of code rates configured for sub-band full-duplex operation.

Aspect 10: The method of aspect 9, further comprising: determining a modulation order for the downlink transmission based at least in part on the first MCS for the downlink transmission; and determining that a modulation order for the uplink transmission is the same as the modulation order for the downlink transmission based at least in part on the one or more bits in the MCS field indicating the code rate for the uplink transmission.

Aspect 11: The method of aspect 10, further comprising: determining a transport block size for the uplink transmission based at least in part on the code rate and the modulation order for the uplink transmission.

Aspect 12: The method of any of aspects 1-11, further comprising: determining a transport block size for the downlink transmission based at least in part on the first MCS indicated in the MCS field of the single DCI message; and determining a transport block size for the uplink transmission based at least in part on the transport block size for the downlink transmission and a configured ratio between the transport block size for the uplink transmission and the transport block size for the downlink transmission.

Aspect 13: The method of any of aspects 1-12, wherein the MCS field further includes one or more bits that indicate a modulation order for the uplink transmission among multiple modulation orders in a set of modulation orders configured for sub-band full-duplex operation.

Aspect 14: The method of aspect 13, further comprising: determining a transport block size for the uplink transmission based at least in part on the first MCS indicated in the MCS field of the single DCI message; and determining a code rate for the uplink transmission based at least in part on the modulation order and the transport block size for the uplink transmission.

Aspect 15: An apparatus for wireless communication at a device, comprising a processor; memory coupled with the processor; and instructions stored in the memory and executable by the processor to cause the apparatus to perform the method of any of aspects 1-14.

Aspect 16: A device for wireless communication, comprising a memory and one or more processors coupled to the memory, the memory and the one or more processors configured to perform the method of any of aspects 1-14.

Aspect 17: An apparatus for wireless communication, comprising at least one means for performing the method of any of aspects 1-14.

Aspect 18: A non-transitory computer-readable medium storing code for wireless communication, the code comprising instructions executable by a processor to perform the method of any of aspects 1-14.

Aspect 19: A non-transitory computer-readable medium storing a set of instructions for wireless communication, the set of instructions comprising one or more instructions that, when executed by one or more processors of a device, cause the device to perform the method of any of aspects 1-14.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a single downlink control information (DCI) message scheduling a downlink transmission and uplink transmission at least partially overlapping in time in different sub-bands of an unpaired band, wherein the single DCI message includes a modulation and coding scheme (MCS) field having a first bit that indicates a first MCS for the downlink transmission; and
   determining a second MCS for the uplink transmission based at least in part on an offset from the first MCS for the downlink transmission, wherein:
   when the MCS field includes zero bits associated with indicating the second MCS, the offset is based at least in part on at least one of:
      a configured offset value relative to the first MCS for the downlink transmission,
      a degree of duality between the uplink transmission and the downlink transmission, or
      a transport block size for the downlink transmission, or
   when the MCS field includes a second bit associated with indicating the second MCS, the offset is based at least in part on at least one of:
      multiple configured offset values including the configured offset value,
      a code rate for the uplink transmission, or
      a modulation order for the downlink transmission.

2. The method of claim 1, wherein the first bit that indicates the first MCS for the downlink transmission corresponds to one or more most significant bits or one or more least significant bits in the MCS field of the single DCI message.

3. The method of claim 1, wherein, when the MCS field includes zero bits indicating the second MCS, the offset is the configured offset value relative to the first MCS for the downlink transmission.

4. The method of claim 1, wherein the second bit dynamically indicates the offset among the multiple configured offset values.

5. The method of claim 1, wherein, when the MCS field includes zero bits indicates the second MCS, the offset is based at least in part on the degree of duality between the uplink transmission and the downlink transmission.

6. The method of claim 5, wherein the degree of duality between the uplink transmission and the downlink transmission is based at least in part on a number of downlink and uplink symbols that are non-overlapping in time.

7. The method of claim 5, wherein the degree of duality between the uplink transmission and the downlink transmission is based at least in part on a frequency separation between resource blocks allocated to the downlink transmission and resource blocks allocated to the uplink transmission.

8. The method of claim 5, further comprising:
   identifying a set of offset values based at least in part on the degree of duality between the uplink transmission and the downlink transmission, wherein the second bit indicates the offset among the multiple configured offset values in the set of offset values.

9. The method of claim 1, wherein the second bit indicates a code rate for the uplink transmission among multiple code rates in a set of code rates configured for sub-band full-duplex operation.

10. The method of claim 9, further comprising:
    determining the modulation order for the downlink transmission based at least in part on the first MCS for the downlink transmission; and
    determining that a modulation order for the uplink transmission is the same as the modulation order for the downlink transmission based at least in part on the second bit indicating the code rate for the uplink transmission.

11. The method of claim 10, further comprising:
    determining a transport block size for the uplink transmission based at least in part on the code rate and the modulation order for the uplink transmission.

12. The method of claim 1, further comprising:
determining the transport block size for the downlink transmission based at least in part on the first MCS indicated in the MCS field of the single DCI message; and
determining a transport block size for the uplink transmission based at least in part on the transport block size for the downlink transmission and a configured ratio between the transport block size for the uplink transmission and the transport block size for the downlink transmission.

13. The method of claim 1, wherein the second bit indicates the modulation order for the uplink transmission among multiple modulation orders in a set of modulation orders configured for sub-band full-duplex operation.

14. The method of claim 13, further comprising:
determining a transport block size for the uplink transmission based at least in part on the first MCS indicated in the MCS field of the single DCI message; and
determining a code rate for the uplink transmission based at least in part on the modulation order and the transport block size for the uplink transmission.

15. A user equipment (UE) for wireless communication, comprising:
a memory; and
one or more processors coupled to the memory, the one or more processors configured to:
receive a single downlink control information (DCI) message scheduling a downlink transmission and uplink transmission at least partially overlapping in time in different sub-bands of an unpaired band, wherein the single DCI message includes a modulation and coding scheme (MCS) field having a first bit that indicates a first MCS for the downlink transmission; and
determine a second MCS for the uplink transmission based at least in part on an offset from the first MCS for the downlink transmission, wherein:
when the MCS field includes zero bits indicating the second MCS, the offset is based at least in part on at least one of:
a configured offset value relative to the first MCS for the downlink transmission,
a degree of duality between the uplink transmission and the downlink transmission, or
a transport block size for the downlink transmission, or
when the MCS field includes a second bit associated with indicating the second MCS, the offset is based at least in part on at least one of:
multiple configured offset values including the configured offset value,
a code rate for the uplink transmission, or
a modulation order for the downlink transmission.

16. The UE of claim 15, wherein the first bit that indicates the first MCS for the downlink transmission corresponds to one or more most significant bits or one or more least significant bits in the MCS field of the single DCI message.

17. The UE of claim 15, wherein, when the MCS field includes zero bits indicating the second MCS, the offset is the configured offset value relative to the first MCS for the downlink transmission.

18. The UE of claim 15, wherein the second bit dynamically indicates the offset among the multiple configured offset values.

19. The UE of claim 15, wherein, when the MCS field includes zero bits indicates the second MCS, the offset is based at least in part on the degree of duality between the uplink transmission and the downlink transmission.

20. The UE of claim 19, wherein the degree of duality between the uplink transmission and the downlink transmission is based at least in part on a number of downlink and uplink symbols that are non-overlapping in time.

21. The UE of claim 19, wherein the degree of duality between the uplink transmission and the downlink transmission is based at least in part on a frequency separation between resource blocks allocated to the downlink transmission and resource blocks allocated to the uplink transmission.

22. The UE of claim 19, wherein the one or more processors are further configured to:
identify a set of offset values based at least in part on the degree of duality between the uplink transmission and the downlink transmission, wherein the second bit indicates the offset among the multiple configured offset values in the set of offset values.

23. The UE of claim 15, wherein the second bit indicates a code rate for the uplink transmission among multiple code rates in a set of code rates configured for sub-band full-duplex operation.

24. The UE of claim 23, wherein the one or more processors are further configured to:
determine the modulation order for the downlink transmission based at least in part on the first MCS for the downlink transmission; and
determine that a modulation order for the uplink transmission is the same as the modulation order for the downlink transmission based at least in part on the second bit indicating the code rate for the uplink transmission.

25. The UE of claim 24, wherein the one or more processors are further configured to:
determine a transport block size for the uplink transmission based at least in part on the code rate and the modulation order for the uplink transmission.

26. The UE of claim 15, wherein the one or more processors are further configured to:
determine the transport block size for the downlink transmission based at least in part on the first MCS indicated in the MCS field of the single DCI message; and
determine a transport block size for the uplink transmission based at least in part on the transport block size for the downlink transmission and a configured ratio between the transport block size for the uplink transmission and the transport block size for the downlink transmission.

27. The UE of claim 15, wherein the second bit indicates the modulation order for the uplink transmission among multiple modulation orders in a set of modulation orders configured for sub-band full-duplex operation.

28. The UE of claim 27, wherein the one or more processors are further configured to:
determine a transport block size for the uplink transmission based at least in part on the first MCS indicated in the MCS field of the single DCI message; and
determine a code rate for the uplink transmission based at least in part on the modulation order and the transport block size for the uplink transmission.

29. A non-transitory computer-readable medium storing one or more instructions for wireless communication, the one or more instructions comprising:
one or more instructions that, when executed by one or more processors of a user equipment (UE), cause the one or more processors to:

receive a single downlink control information (DCI) message scheduling a downlink transmission and uplink transmission at least partially overlapping in time in different sub-bands of an unpaired band, wherein the single DCI message includes a modulation and coding scheme (MCS) field having a first bit that indicates a first MCS for the downlink transmission; and determine a second MCS for the uplink transmission based at least in part on an offset from the first MCS for the downlink transmission, wherein:
  when the MCS field includes zero bits indicating the second MCS, the offset is based at least in part on at least one of:
    a configured offset value relative to the first MCS for the downlink transmission,
    a degree of duality between the uplink transmission and the downlink transmission, or
    a transport block size for the downlink transmission, or
  when the MCS field includes a second bit associated with indicating the second MCS, the offset is based at least in part on at least one of:
    multiple configured offset values including the configured offset value,
    a code rate for the uplink transmission, or
    a modulation order for the downlink transmission.

30. An apparatus for wireless communication, comprising:
  means for receiving a single downlink control information (DCI) message scheduling a downlink transmission and uplink transmission at least partially overlapping in time in different sub-bands of an unpaired band, wherein the single DCI message includes a modulation and coding scheme (MCS) field having a first that indicates a first MCS for the downlink transmission; and
  means for determining a second MCS for the uplink transmission based at least in part on an offset from the first MCS for the downlink transmission, wherein:
    when the MCS field includes zero bits indicating the second MCS, the offset is based at least in part on at least one of:
      a configured offset value relative to the first MCS for the downlink transmission,
      a degree of duality between the uplink transmission and the downlink transmission, or
      a transport block size for the downlink transmission, or
    when the MCS field includes a second bit associated with indicating the second MCS, the offset is based at least in part on at least one of:
      multiple configured offset values including the configured offset value,
      a code rate for the uplink transmission, or
      a modulation order for the downlink transmission.

* * * * *